Figure 1:
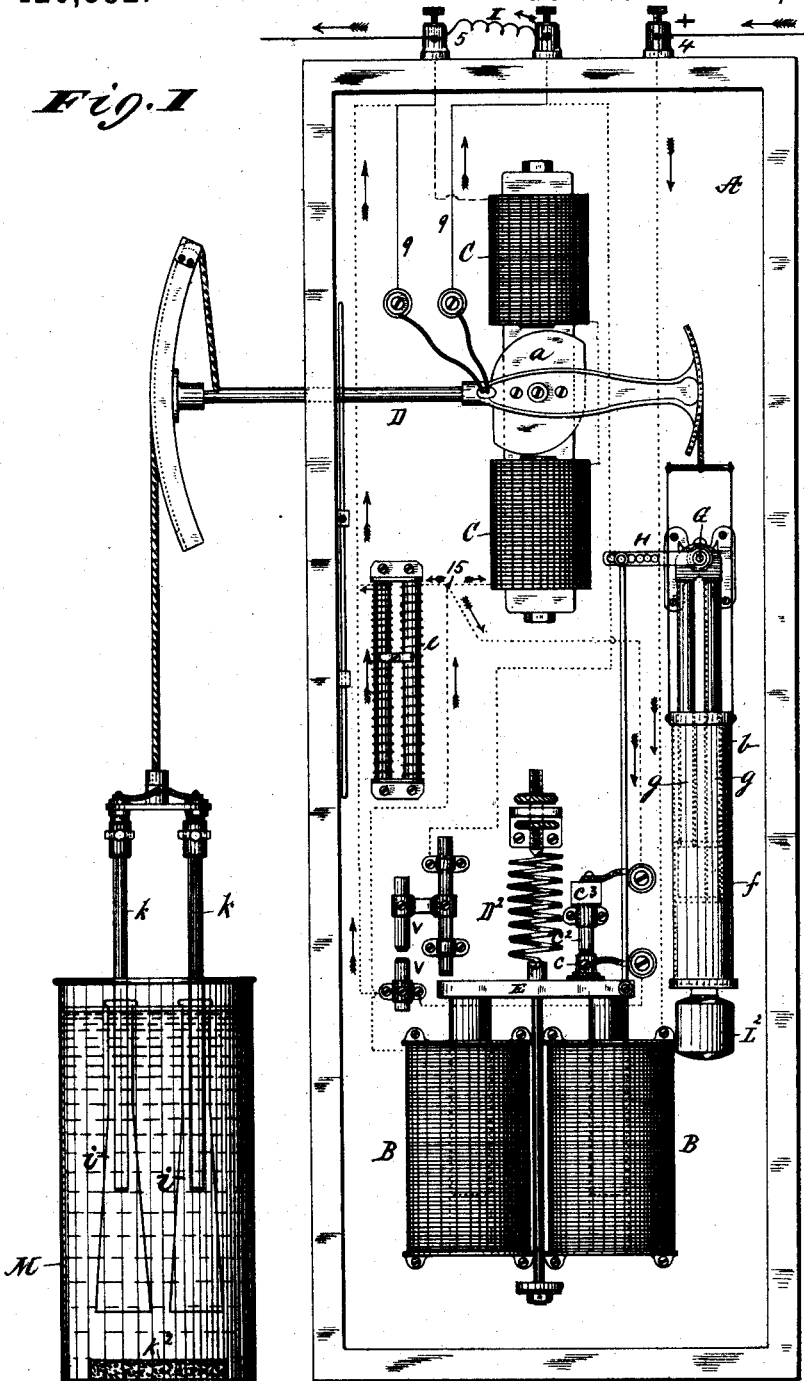

(No Model.) 3 Sheets—Sheet 1.

H. LEMP & M. J. WIGHTMAN.
ELECTRIC REGULATING MECHANISM.

No. 420,882. Patented Feb. 4, 1890.

WITNESSES

INVENTOR
Hermann Lemp
Merle J. Wightman
BY
Townsend & MacArthur
ATTORNEYS (No Model.) 3 Sheets—Sheet 2.
H. LEMP & M. J. WIGHTMAN.
ELECTRIC REGULATING MECHANISM.
No. 420,882. Patented Feb. 4, 1890.
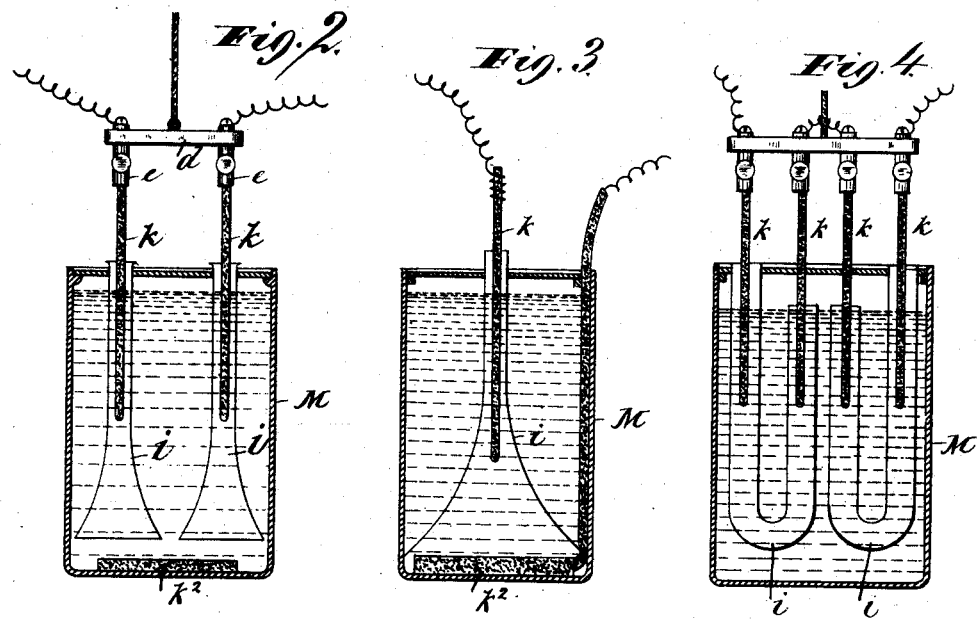
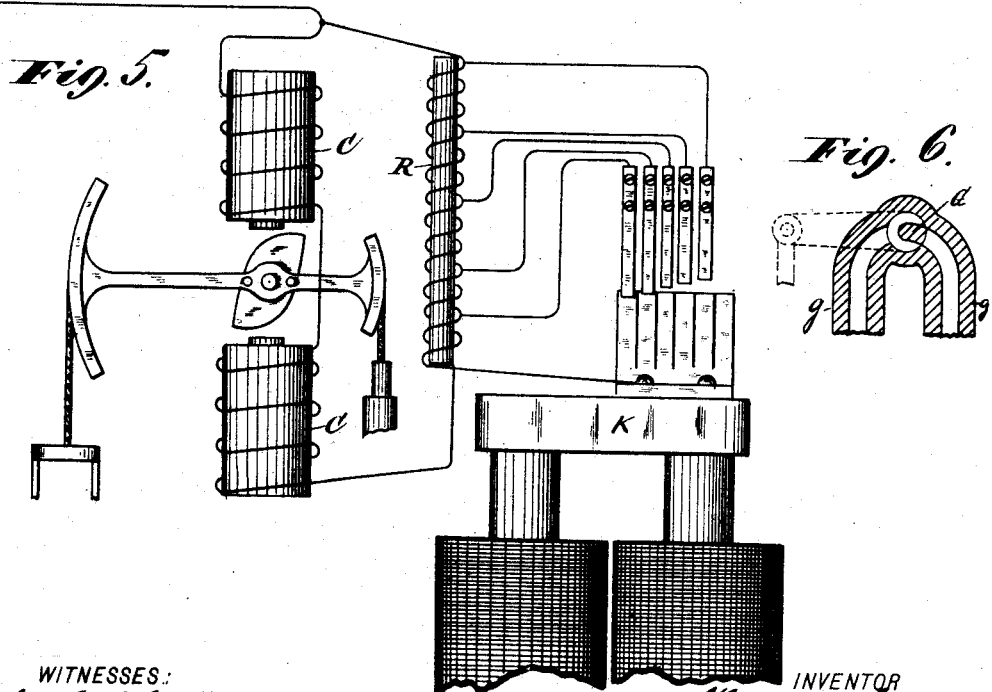
WITNESSES:
INVENTOR
Hermann Lemp
Merle J. Wightman
BY
Townsend & MacArthur
ATTORNEYS (No Model.) 3 Sheets—Sheet 3.
H. LEMP & M. J. WIGHTMAN.
ELECTRIC REGULATING MECHANISM.
No. 420,882. Patented Feb. 4, 1890.
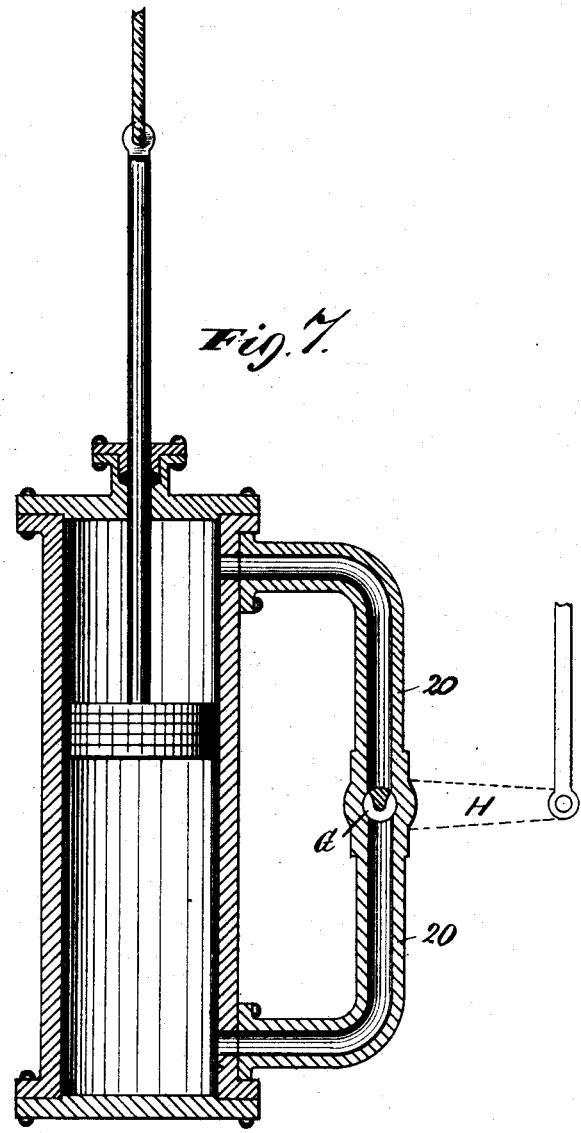
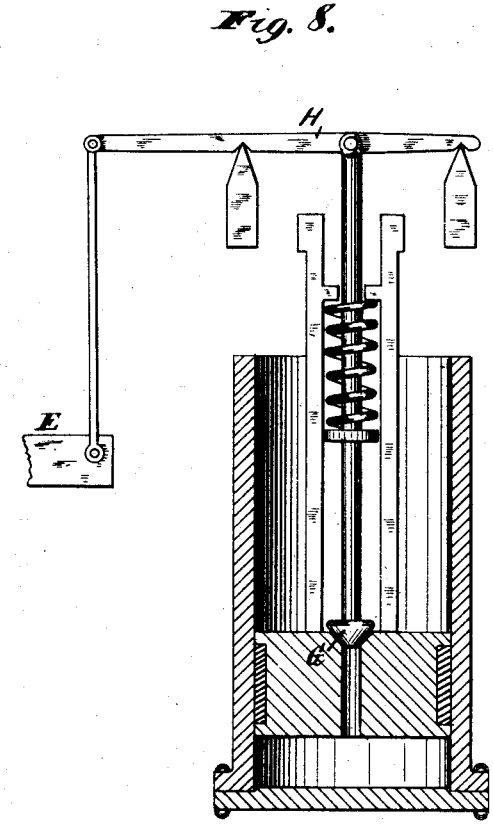

UNITED STATES PATENT OFFICE.

HERMANN LEMP AND MERLE J. WIGHTMAN, OF HARTFORD, CONNECTICUT, ASSIGNORS TO THE SCHUYLER ELECTRIC COMPANY, OF CONNECTICUT.

ELECTRIC REGULATING MECHANISM.

SPECIFICATION forming part of Letters Patent No. 420,882, dated February 4, 1890.

Application filed June 21, 1887. Serial No. 241,996. (No model.)

*To all whom it may concern:*

Be it known that we, HERMANN LEMP and MERLE J. WIGHTMAN, citizens of the United States, and residents of Hartford, in the county of Hartford and State of Connecticut, have invented certain new and useful Electric Regulating or Controlling Mechanism, of which the following is a specification.

Our invention relates to that class of electric apparatus in which an electro-magnet, operating as a controller-magnet, serves to throw into or out of action a motor mechanism consisting of an electro-magnetic device, or any motive power mechanism for the purpose of effecting any desired mechanical operation.

Our invention is designed primarily for application to electric apparatus where it is desired to adjust a resistance, move a commutator-brush, or perform any other operation upon electric apparatus by means of the motor mechanism when controlled by the controller-magnet. It is to be understood, however, that the devices described may be used for effecting any other mechanical operation—as, for instance, the opening or closing of a valve, or for other purposes. We have in the present instance, however, illustrated the application of our invention to the controlling of a variable electric resistance device employed as a means for governing the flow of current to an electro-magnet, which, being the field-magnet of a dynamo-electric machine, would determine or govern the electro-motive force of said machine, and therefore the amount of current on the circuit.

Our invention consists, generally speaking, in the combination, with the motor mechanism, of a retarding device having a variable retarding effect in both directions of movement of said mechanism, which effect is governed or adjusted automatically by the controller-magnet, or by a magnet in circuit therewith or controlled thereby, and either directly or indirectly in such way that the magnitude of the change in the power of said controller-magnet shall effect a corresponding change in the adjustment of the retarding mechanism, so that with a large change the latter shall retard the motor mechanism to a less degree, and therefore allow a quick or rapid movement of the same in either direction. As the retarding mechanism, we prefer to employ a dash-pot having a variable resistance.

Our invention consists, further, in the improvements in the details of construction and combinations of parts that will be more particularly hereinafter described, and then specified in the claims.

In the drawings, Figure 1 is a side elevation of an apparatus embodying our invention. Fig. 2 is a vertical section of an improved variable electric resistance device which we employ in connection with the motor mechanism for adjusting the flow of current to the field-magnet of a dynamo or to any other electrical apparatus. Figs. 3 and 4 show in vertical section other forms of our variable electric resistance. Fig. 5 shows an arrangement of circuits and devices which may be employed when the motor mechanism consists of an electro-magnet whose power or action is governed by the controller-magnet. Fig. 6 is a vertical section of a portion of the variable-resistance dash-pot devices. Fig. 7 is a vertical section of a modification of the variable-resistance dash-pot. Fig. 8 is a side elevation, in section, of a modified device that may be employed for governing the resistance of the dash-pot to the movements of the motor mechanism.

Referring to Fig. 1, A indicates a suitable frame or base-support, to which the various parts of the mechanism are secured, or upon which they are supported.

B indicates the controller electro-magnet, which may be of any desired or suitable construction, and C the coils of the motor electro-magnet, *a* being the armature for said electro-magnets, which armature is carried by a lever D, which is connected with the devices to be operated upon, and which, in the present instance, is moved in one direction by the weight of a suitable retractor consisting of the weight of the dash-pot *b*, and in the other direction by the motor-magnet, whose armature *a* is of proper form or construction to be turned when the current flows in the coils of electro-magnet C.

Current is admitted to or diverted from the coils C by the operation of the controller-magnet B in any suitable way. A device which may be used for this purpose consists of an electric contact $c$, which is carried by a cross-bar E, as indicated, secured to the movable cores of the electro-magnet B. The contact $c$ is brought into and out of connection with a second contact $c^2$ through movements of the core of the magnet actuated in one direction or the other, according to the preponderance of the power of the magnet-coils or of a suitable adjustable retracting-spring $D^2$, secured to the cross-piece. The contact $c^2$ is preferably made as a yielding contact, so that after connection is established between $c$ and $c^2$ the cross-piece E may continue to move without sensible opposition under the effect of the retractor. For this purpose the contact $c^2$ is made to slide in a suitable guide, as indicated, its downward movement being, however, limited by a head $c^3$, so that a sufficient movement of the parts effected by the electro-magnet B may open the contacts $c\ c^2$.

The coils of the electro-magnet B are in circuit from binding-post 4 to binding-post 5, as indicated, which circuit includes the coils C C. At the point 15 the circuit branches, one branch including the coils C, the other the contacts $c\ c^2$, and the third an adjustable resistance $e$, so that the current will branch when the contacts $c\ c^2$ are open through the coils C and the resistance $e$, while if the branch-containing contacts $c\ c^2$ be closed the resistance and the coils will be both shunted. When the contacts are open, current passes through the coils C in sufficient amount to turn the armature $a$. The resistance $e$ may be of any desired kind, but is preferably made adjustable for the purpose of regulating the power of the motor-magnet.

The dash-pot cylinder $b$ is supported from the lever of the motor mechanism in any suitable manner, so as to be movable therewith, while the piston $f$ of said cylinder is supported in fixed position by two tubes $g\ g$, carried by a bracket or other support and united at their upper ends. The tubes $g\ g$ open one into the space below the piston and the other into the liquid-space above the same. In the passage formed by said tubes and uniting the liquid or fluid spaces at opposite sides of said pistons is a valve G, which may be of the form indicated in Fig. 6, so that when turned in either direction from the position shown it will open the passage to a variable amount, depending upon the degree of movement. In the normal position of the valve, which is that shown in the drawings, Fig. 6, the passage is closed, and as the liquid cannot then escape from one side of the piston to the other the lever D cannot move under the operation of the electro-magnet or of its retractor. When the valve is open, however, the motor-magnet mechanism may move either by its retractor or by its magnetic power, its movement being retarded to a variable degree, depending upon the extent of opening of the valve. The stem of the valve is connected to a lever H, which in turn is joined by a link, as indicated, to the cross-bar E, so that the valve may be operated by the controller-magnet.

Other forms of dash-pot or retarding mechanism may be used in the place of that described.

In the modification indicated in Fig. 7 the dash-pot cylinder is supposed to be stationary and the piston to be movable in the ordinary way, while the passage of variable cross-section is formed in a tube 20, connected to the dash-pot cylinder at points above and below the extreme range of movement of the piston. By constructing the valve as shown it is obvious that a movement of the cross-bar E in either direction will open said valve.

It may sometimes be desirable to place the valve in a passage leading through the piston, and arranging the same so that the valve can be opened by movement of the valve in one direction only. In this case an arrangement of devices such as shown in Fig. 8 may be employed for causing the valve to open on a movement of the bar E in either direction. The valve G is an ordinary plug-valve, whose stem connects with a lever H at a point between two fulcra or pivotal points for said lever. The piston is in this instance stationary, being supported by a suitable rod, as indicated. When the lever H rests on both points of support, as indicated, the valve is closed; but if the bar E move either up or down the lever will rock upon one or the other of its pivotal points of support and raise the valve G, so as to open the passage through the piston to an amount depending upon the extent of movement of the bar E.

In the present case we have illustrated the application of our invention to regulating the flow of current in a set of coils connected between two posts at the top of the apparatus, Fig. 1, which coils are supposed to be the field-magnet coils of a dynamo-electric machine, said coils being in the main or principal circuit and the coils B of the motor-magnet being also connected into said circuit. The flow of current to the field-magnet coils is determined by means of a liquid-resistance device, whose two electrodes or terminals are connected to the wires 9 9 to the two terminals of the field-magnet coil.

The liquid-resistance device is constructed as follows: M indicates a jar of glass or other material, which is nearly filled with water or other suitable liquid. Projecting slightly above the surface of the liquid and extending down nearly to the bottom of the jar are two glass tubes $i$, set a few inches apart and supported in any suitable manner. Within these tubes slide the adjustable electrodes $k\ k$, carried by a suitable cross-piece, which is supported from the end of the lever D, as indicated, in any suitable manner, but preferably by the insulated electric conductors, which form continuations of the wires 9 9, and are connected, respectively, to the upper ends of the electrodes $k\ k$. The tubes are of restricted cross-sectional area as compared with the length of the volume of resisting liquid between the two electrodes or points of connection of the electric circuit with the liquid. By this means the resistance is largely increased over that which would exist if the electrodes dipped into a comparatively-large body of liquid, and small movements of the electrodes will produce large variations of electric resistance. The electrodes $k$ are preferably carbon electrodes or sticks of, say, one-half inch in diameter and of length to suit the height of the jar or the extreme variations of electrical resistance which it is desired to produce. In the bottom of the jar, or within the range of the two electrodes $k$, when allowed to drop to the extreme position, is preferably placed a disk or block of carbon $k^2$, or other conducting material, which will serve to connect the electrodes directly, thus forming a shunt to the resistance of the liquid. It is evident that by raising and lowering these rods in the liquid any required resistance may be obtained (between the upper terminals) between the limits afforded by the resistance of the liquid which separates the lower extremities of the carbon rods when they are lowered to the bottom of the jar and the resistance of the liquid which separates the same points when they are raised almost to the surface of the liquid. Of these distances the minimum is equal to the parallel distance between the rods, while the maximum is made up of this distance plus the added length of liquid in both glass tubes and the decreased contact surface of electrodes and liquid.

In order to obtain any desired graduation of resistance per unit of length through which the carbon rods may be moved, we may give a variety of shapes to the glass tubes. In the case where the resistance is a shunt to or in series with a field-magnet circuit the bell or funnel shape, as shown in Fig. 2, is preferred. In the lowest position a very slight change of resistance for a given movement of carbons is necessary, while at the top the resistance approaches infinity and for a given movement a great change of resistance is obtained. In practice with the arrangement as shown the resistance can be varied from short circuit to an infinitely great one, and the resistance is so great when the carbons are in the extreme upper position that they may be withdrawn from contact with the liquid without perceptible increase in resistance. This arrangement is equally adapted to the setting of any required resistance by hand, or to the employment of automatic devices where a varying resistance is required.

Other forms of tubes may be used for different applications of variable resistances. The arrangement shown in Fig. 4 gives a more uniform increase of resistance for a given movement of carbons, and also a very great range.

It is obvious that the carbons might be stationary and the tubes move, or that the tubes and electrodes be stationary and the length of liquid be changed by drawing off the liquid to another vessel or allowing it to flow back according to the requirements.

The action of the arrangement is as follows: The tension-spring $D^2$ is adjusted so that with the normal current the relay-contacts $c$ $c^2$ are lightly pressed together, thus practically short-circuiting the motor-magnets C C. The lever D, attached to armature $a$, owing to the weight $L^2$, attached to the dash-pot, tends to rotate in the direction of the arrow; but with the relay-armature in this position the valve is perfectly closed and the lever D, with the carbon electrodes, is held stationary. Should the current fall below the normal, the valve G opens according to the amplitude of current variation, and allows the lever D to fall back, withdrawing the carbons from the tubes, and thus adjusting the resistance until the relay-armature is brought back to the normal position.

One very important advantage gained with the valve dash-pot is in the accomplishment of adjustment with variable speed—that is, should the change of current from normal be very great the valve is widely opened and a quick movement occurs, which gradually slackens as the normal current is approached. This permits of a quick adjustment without the common fault of seesawing or pumping of most regulators. The action of the regulator in the opposite direction is similar. The movement of the relay-armature opens the valve G more or less, and at the same time separates the contacts $c$ $c^2$, allowing the current to energize the motor-magnets C C. The armature and lever are now rotated in the opposite direction until the required resistance is reached.

It is evident that a solenoid or any other form of motor-magnet may be used, provided it gives a sufficiently large range of movement. As a regulator for constant potential circuits, the motor and relay helices would necessarily be wound with high-resistance coils connected in parallel to the lamps.

An additional and valuable feature of our regulator consists in the so-called "safety-contacts" V V. These consist, preferably, of carbon pencils connected to the terminals of the field, and when in contact makes a short circuit around the same. This short circuit is subject to the movement of relay-armature E, which supports the upper sliding contact V, and only happens when a very abnormal increase of current occurs. Should such an increase occur, the carbons are brought into contact and held there for an instant, or until the current drops below the point at which the contacts act. If the current increases again at the separation of carbons, they are immediately brought into contact, and this intermittent action is kept up until the lever D has moved so as to reach the resistance required to hold the current at its normal strength. If a great amount of current passes through the safety-contacts V V, an arc is kept up between them until the current is finally shunted from them through the liquid resistance.

Instead of controlling the motor-magnet by the arrangement of contacts shown in Fig. 1, we sometimes employ the arrangement of contacts shown in Fig. 5, combined with an artificial resistance, (indicated at R,) which is in a shunt around the motor-magnets, but is connected at intervals to a series of contact-springs with which a contact spring or plate carried by a cross-bar E comes into successive contact as the bar moves under the influence of the retractor, the obvious effect being that the farther the bar moves the more of the resistance is shunted and the more the current is diverted from the motor-magnet.

Any other arrangement of contacts or resistances might be employed for effecting electrical control of the motor-magnet, and any desired motor-magnet mechanism may be employed in the place of that shown.

In the arrangement shown in Fig. 5 the effect of a yielding contact similar to that obtained in Fig. 1 is produced by allowing the movable contact to slide over the surface of a series of springs or plates connected at intervals to the artificial resistance. It is of course to be understood that the movable contact is connected to one terminal of the resistance, while the shorter of the series of contacts, or that with which the movable contact last makes connection, is connected to the other terminal, this being the obvious and well-known arrangement to be employed under the circumstances or conditions just described.

Instead of the forms of variable electric resistance which we have hereinbefore described, we may employ that shown in Fig. 3; but this form is not so well adapted to the purposes of our invention, in that it does not give as free range of resistance for a given movement of the motor mechanism as do the other forms which we have before referred to.

The arrangement of apparatus hereinbefore described is adapted to maintain the constant current of a circuit; but it is obvious that the same device might be combined for constant potential. It is apparent, also, that instead of regulating the flow of current to a field-coil by shunting current from the same the device might be employed in other ways for governing the flow of current to said coil, or might be used in any desired manner for governing the flow of current to any electrical apparatus—as, for instance, to a group of incandescent lamps on arc circuits.

The devices as used for operating the resistance may be employed in all cases where an automatic adjustment of resistance is desired.

What we claim as our invention is—

1. The combination of a dash-pot having a passage of variable cross-section between the spaces at opposite sides of its piston, a valve which opens said passage when moved in either direction from normal position, and an electro-magnet governing said valve, as and for the purpose described.

2. In an electric regulator, the combination, with the motor mechanism for said regulator, of a dash-pot, a valve controlling the flow of liquid in said dash-pot and arranged to open to variable extent when moved in either direction from normal position, and an electro-magnet whose power varies with the variation of current and which is connected with said valve, as and for the purpose described.

3. The combination, with an electro-magnet and dash-pot connected therewith, of a passage connecting the spaces at the opposite sides of the dash-pot piston, a valve in said passage, and a controlling electro-magnet for opening said valve on a movement of the magnet's armature in either direction from normal position.

4. The combination of the motor-magnet, the retarding device, and the governing electro-magnet controlling the action of the retarding device, and yielding controller-contacts electrically controlling the motor-magnet, as and for the purpose described.

5. The combination, in an electric resistance device, of a receptacle containing a body of liquid, a pair of tubes of insulating material immersed therein and containing a column of such liquid, and adjustable electrodes adjustable in said tubes and in circuit in series with one another through the liquid contained in the tubes.

6. A liquid electric resistance whose cross-sectional area in planes transverse to the direction of the flow of the current varies at different points on the line joining the electrodes, as and for the purpose described.

7. The combination, with a body of liquid, of an insulating-tube immersed therein and containing a column of liquid of comparatively small cross-sectional area, forming the liquid resistance, and a conductor adjustable in said tube so as to vary the length of said column in circuit, and thereby vary the resistance.

8. The combination, with a liquid-containing tube whose cross-section varies in the direction of its longitudinal axis and an adjustable electrode in said liquid, of a low-resistance contact placed at or near an extreme of adjustment so as to completely shunt the current from the liquid, as and for the purpose described.

Signed at Hartford, in the county of Hartford and State of Connecticut, this 17th day of June, A. D. 1887.

HERMANN LEMP.
MERLE J. WIGHTMAN.

Witnesses:
R. E. DUNSTON,
CHAS. E. DUSTIN.